United States Patent Office 3,464,930
Patented Sept. 2, 1969

3,464,930
OXIDATION CATALYST CONTAINING
VANADIUM AND TITANIUM
Wilhelm Friedrichsen, Ludwigshafen (Rhine), and Otto
Goehre, Wilhelmsfeld, Germany, assignors to Badische
Anilin- & Soda-Fabrik Aktiengesellschaft, Ludwigshafen
(Rhine), Germany
No Drawing. Filed May 9, 1966, Ser. No. 548,404
Claims priority, application Germany, May 18, 1965,
B 81,979, P 14 42 590.2
Int. Cl. B01j 11/06, 11/32
U.S. Cl. 252—469                                   11 Claims

ABSTRACT OF THE DISCLOSURE

A catalyst for the gas phase oxidation of aromatic hydrocarbons or unsaturated aliphatic hydrocarbons into carboxylc acids which consists essentially of an inert nonporous carrier coated to a thickness of about 0.02 to 2 mm. with a composition of 1 to 15% by weight of vanadium pentoxide and 85 to 99% by weight of titanium dioxide, the catalyst having a content of vanadium pentoxide of 0.05 to 3% by weight. The catalyst is particularly useful for the oxidation of o-xylene to phthalic acid and permits high yields at high space velocities in contact with a catadlyst in which the vanadium content is quite small.

---

Many catalysts have already been proposed for the oxidation of aromatic hydrocarbons and unsaturated aliphatic hydrocarbons to carboxylic acids. Almost all these catalysts contain vanadium compounds as the active constituent, with activating additions of metal oxides, such as the oxides of zinc, cerium, chromium, titanium, boron, zirconium, bismuth, tungsten, lead and cobalt or also compounds of silver, copper, nickel or phosphorus. Alkali metal compounds and alkaline earth metal compounds have also been used as additives.

None of the catalysts described is however entirely satisfactory in carrying out oxidation reactions on a commercial scale. The yields are usually unsatisfactory, particularly with high conversions of the starting material. In many cases the catalyst will permit only low space velocities. The life of the catalysts is also often unsatisfactory.

The object of the present invention is to provide a catalyst containing vanadium and titanium which permits the oxidation of aromatic hydrocarbons and unsaturated aliphatic hydrocarbons to carboxylic acids in good yields with high conversions, and with which high space velocities are possible and which has a long life.

This and other objects are achieved in accordance with this invention with a catalyst containing vanadium and titanium for the oxidation of aromatic hydrocarbons and unsaturated aliphatic hydrocarbons to carboxylic acids, in which an inert nonporous carrier is coated with a layer of a composition 0.02 to 2 mm. thick which contains 1 to 15% by weight of vanadium pentoxide and 85 to 99% by weight of titanium dioxide, the catalyst having a content of vanadium pentoxide of less than 3% by weight.

The new catalyst enables hydrocarbons to be oxidized to form carboxylic acids in particularly high yields. In particular the proportion of by-products resulting from the oxidation reaction proceeding too far (combustion) is low. Excellent yields may be obtained even when the starting material is practically entirely converted. The catalyst permits particularly high space velocities and exhibits practically no loss in activity even after operation for very long periods. In fact the yield in prolonged operation often even rises for example by 2 to 5%.

The catalyst is suitable for many of the prior art oxidation reactions of aromatic hydrocarbons and unsaturated aliphatic hydrocarbons to form carboxylic acids. Good results are obtained in the oxidation of olefinically unsaturated hydrocarbons which in particular have three to five carbon atoms and one or two olefinic double bonds, for example in the oxidation of propylene to acetic acid and in the oxidation of butene-(1), butene-(2) or butadiene-(1,3) to maleic acid. Suitable aromatic hydrocarbons which are converted by oxidation into carboxylic acids preferably contain six to twelve carbon atoms, such as benzene which is oxidized to form maleic acid, naphthalene which is oxidized to form phthalic acid, and benzenes and naphthalenes bearing one to four methyl groups as substituents, such as toluene, which is oxidized to form benzoic acid, α- or β-methylnaphthalene which is converted by oxidation into α- or β-naphthoic acid, and durene which is oxidized to form pyromellitic acid. Particularly good results are obtained in the oxidation of o-xylene to phthalic acid. The catalyst permits high space velocities and, for example, in the production of phthalic anhydride gives a yield by weight of more than 100% even at a space velocity of 10,000 times the volume of reaction mixture per unit volume of catalyst per hour.

Nonporous, inert materials are used as catalysts, i.e., materials free from pores or having a small surface area, preferably less than 3 sq. m./g., advantageously 0.005 to 2 sq. m./g., such as quartz or silicic acid or particularly porcelain, fused aluminum oxide, silicon carbide and fused or sintered silicates, for example aluminum silicate, magnesium silicate, zinc silicate and zirconium silicate and particularly steatite. Both synthetic and natural materials may be used. The carrier for the catalyst advantageously has a mean particle size of from 2 to 10 mm. and is preferably used in the form of spheres, pellets or cones.

Sometimes it is advantageous to roughen the surface of smooth carriers to a slight extent prior to their use by etching, for example with hydrofluoric acid, gaseous hydrogen fluoride, or ammonium fluoride solution, in order to improve adhesion of the active composition.

It is often an advantage to prime, precoat or pretreat the carrier with 0.05 to 1.5% by weight, particularly 0.1 to 1% by weight, of an oxide of the metals vanadium, molybdenum, tungsten, chromium, titanium or iron or a mixture of these oxides prior to coating the carrier with the composition containing vanadium pentoxide and titanium dioxide. For this purpose the said oxides (or compounds of the said metals which are converted by heating into the oxides) as melts or preferably in solution are brought into contact with the carrier so that a uniform layer forms on the carrier. The metal compounds are advantageously used dissolved in water, ammonium thiocyanate or an organic solvent, such as urea, thiourea or alcohols. In order to achieve adequate strength of the priming, and in order to achieve good adhesion of the subsequent coating, it is advantageous to heat the carrier to a temperature of from 300° to 1000° C. prior to coating, i.e., after priming.

The composition which is used to coat the catalyst and which in the dry state should contain 1 to 15% by weight of vanadium pentoxide and 85 to 99% by weight of titanium dioxide, is prepared by conventional methods. For example finely divided titanium dioxide may be soaked with a solution of a vanadium compound in water or an organic solvent, such as formamide, molten thiourea or a monohydric or polyhydric alcohol, so as to produce a paste of more or less honeylike consistency. Ammonium thiocyanate or other readily fusible and readily volatile salts may also be used as pasting agents.

Coating the carrier with the active composition is also carried out by conventional methods, for example in a coating drum, with the gradual addition of the paste, advantageously while simultaneously effecting drying with hot air. Coating may also be effected by mixing the carrier, finely divided titanium dioxide and vanadium compound in a coating drum together with a fusible organic substance at a temperature above the melting point of the said organic substance. It is advantageous to use a temperature range of from 80° to 150° C. The active composition is used in an amount which is necessary to cover the carrier with a layer having a thickness of 0.02 to 2 mm., particularly 0.05 to 1 mm., the finished catalyst containing 0.05 to 3%, preferably 0.1 to 2%, particularly 0.1 to 1%, by weight of vanadium pentoxide. To consolidate the coating, it is advantageous to heat the catalyst for some time, for example about half to ten hours, in a current of air at elevated temperature, for example 200° to 600° C., until organic substances are burnt.

The catalyst coating may consist of vanadium pentoxide and titanium dioxide in the said amounts, or in addition to vanadium and titanium, may contain small amounts of silver, iron, cobalt, nickel, chromium, molybdenum and/or tungsten, particularly in the form of oxides or hydroxides. These metals are advantageously used in an amount of 0.1 to 3% by weight with reference to the catalyst coating.

The oxidation reactions are carried out by conventional methods, i.e., in the gas phase using oxygen-containing gases or oxygen, at atmospheric, subatmospheric or superatmospheric pressure and at temperatures of from 250° to 600° C.

The invention is illustrated by the following examples.

EXAMPLE 1

188 g. of finely divided titanium dioxide is added to a solution of 28 g. of vanadyl oxylate in a mixture of 30 g. of formamide and 60 g. of water and stirred into a paste. The paste is gradually introduced into a coating drum containing 1200 cc. of unglazed porcelain spheres having a diameter of 5 mm., while hot air is passed in at the same time, until the thickness of the layer is 0.09 mm. The spheres coated with the composition are then heated in a muffle furnace for two hours at 250° C. The finished catalyst contains 3.2% of active composition and the content of vanadium pentoxide is 0.19%.

1100 cc. of the catalyst thus prepared is placed in a vertical tube having an internal diameter of 25 mm. which is heated in a salt bath. The height of the filling is 2.50 meters. 140 g. per hour of 98% o-xylene in vapor phase is passed over this catalyst layer mixed with 3500 liters per hour of air at 400° C. 154.4 g. of phthalic anhydride is obtained per hour in addition to 9.2 g. of maleic anhydride. Calculated on pure o-xylene, the yield by weight of phthalic anhydride is 112.5%. The theoretical yield is 80.5%.

A similar result is achieved with a catalyst which has been prepared in an analogous way and whose coating also contains 0.2% by weight of silver oxide and 0.1% by weight of nickel oxide.

Very good results are also obtained with a catalyst, prepared in an analogous way, whose coating contains 0.4% by weight of chromium oxide in addition to the said amounts of titanium dioxide and vanadium pentoxide.

EXAMPLE 2

Fused aluminum silicate is reduced to a particle size of 0.2 to 0.5 mm. The particles are shaped into spheres and sintered so that a pore-free surface is formed. The diameter of the spheres is 6.5 mm.

16 g. of vanadyl oxylate is dissolved in 30 cc. of formamide at 120° C. This solution is stirred with 106 g. of anatase to form a thick paste. This is brushed onto a plate to a thickness of about 0.5 mm. 290 g. (300 cc.) of the said spheres are lightly rolled on the plate so that the surface of the spheres is coated with the active composition. The spheres are then dried and heated in a muffle furnace at 250° C. The thickness of the layer of active material is 0.2 mm. The finished catalyst contains 8.8% of active composition and the content of vanadium pentoxide is 0.53.

The spheres thus prepared are placed in a tube 80 cm. in length having an internal diameter of 25 mm. The tube is heated in a salt bath. At a temperature of 390° C., 42 g. of 98% o-xylene in vapor phase and 1000 liters of air are passed over the catalyst per hour. 46.2 g. of phthalic anhydride in addition to 2.7 g. of maleic anhydride are obtained per hour. Calculated on pure o-xylene, the yield by weight on phthalic anhydride is 111.3%. The theoretical yield is 79.8%.

A similar result is achieved with a catalyst prepared in an analogous way whose coating, besides the amounts of titanium dioxide and vanadium pentoxide, contains 1.0% by weight of tungsten oxide or 0.7% by weight of tungsten oxide, 0.15% by weight of iron oxide and 0.15% by weight of cobalt oxide.

EXAMPLE 3

2000 g. of magnesium silicate spheres are used which have a bulk density of 1.51 g./cc., a diameter of 6.6 mm. and which for better adhesion of the active layer have been slightly etched with concentrated hydrofluoric acid at room temperature for about three minutes. The spheres which are placed in a heated cotaing drum are coated with a paste of 32 g. of vanadyl oxalate, 50 g. of formamide, 60 g. of water and 212 g. of titanium dioxide until the thickness of the layer is 0.1 mm. The spheres, coated with 96 g. of the active composition, are heated at 400° C. in a muffle furnace for two hours. The finished catalyst contains 4.6% of active composition and 0.28% of vanadium pentoxide.

At a temperature of 380° C., 4000 liters of air and 164 liters of 98% o-xylene in vapor phase are passed per hour in a tube as in Example 1 over 1170 cc. of the catalyst thus prepared. 179.9 g. of phthalic anhydride in addition to 9.6 g. of maleic anhydride are obtained per hour. The yield by weight, calculated on pure o-xylene, is 111.8%. The theoretical yield is 80%.

EXAMPLE 4

7 g. of titanium tetrachloride is dissolved in 20 cc. of glacial acetic acid while cooling. The solution formed is uniformly distributed onto 250 cc. of fused aluminum oxide having a particle size of 4 to 6 mm. in a drum. The carrier thus treated is dried in a current of air. The glossy coating is then fixed by heating for two hours in a muffle furnace at 400° C.

The carrier which has been thus pretreated is brought into contact with a paste which has been prepared from a solution of 40 g. of vanadyl oxalate in 40 cc. of formamide and 75 cc. of water with the addition of 270 g. of anatase. The excess paste is removed by shaking on a screen and the catalyst is first heated slowly to 200° C. and then heated for five hours at 400° C. in a muffle furnace. It contains 5% of active composition and has a content of 0.5% of vanadium pentoxide.

The finished catalyst is placed in a vertical tube having a length of 80 cm. and an internal diameter of 25 mm. which is heated in a salt bath. 41 g. of 98% o-xylene and 1100 liters of air are passed per hour over the catalyst at 400° C. 42.2 g. of phthalic anhydride in addition to 3.5 g. of maleic anhydride is obtained per hour. Calculated on pure o-xylene, the yield by weight of phthalic anhydride is 105%. The theoretical yield is 75.1%.

EXAMPLE 5

250 cc. of porcelain spheres having a diameter of 5 mm. are wetted with a solution of 20 g. of vanadyl oxalate in 10 g. of formamide and 10 g. of urea by shaking in a vessel and then heated at 200° C. until the solvent has evaporated. The spheres are then heated for thirty minutes at 700° C. in a muffle furnace. This procedure is repeated so that the porcelain spheres are coated with a layer of 0.4% by weight of vanadium pentoxide.

The carier pretreated in this way is then coated with a paste of vanadium oxalate and titanium dioxide as described in Example 4. The finished catalyst contains 3.3% of active composition. The total content of vanadium pentoxide is 0.49%.

In the oxidation of o-xylene under the conditions described in Example 4 the catalyst yields at 410° C. 45.7 g. of phthalic anhydride and 2.8 g. of maleic anhydride per hour. The yield of phthalic anhydride by weight is 113.6% with reference to pure o-xylene. The theoretical yield is 81.5%. The yield by weight is 112.5% when the porcelain spheres are not pretreated with vanadium pentoxide. If the spheres be pretreated with a solution of iron acetate and chromium acetate in an analogous way so that they have a priming of 0.2% by weight of chromium oxide and 0.2% by weight of iron oxide, and then coated in the manner described above with titanium dioxide and vanadium pentoxide, a yield of 113.4% by weight of phthalic anhydride is achieved in the oxidation of o-xylene.

EXAMPLE 6

5 g. of molybdic acid is idssolved in a mixture of 8 cc. of ethanolamine, 2 cc. of water and 10 g. of urea and made up to 20 cc. with formamide. 469 g. of steatite spheres having a diameter of 5.5 mm. are wetted with 10 cc. of the said solution by shaking, dried at 200° C. and heated in a muffle furance for fifteen minutes at 830° C. The amount of molybdic acid applied amounts to 0.7 g. The spheres thus pretreated are coated as described in Example 4 with the active vanadium oxalate/titanium dioxide composition, dried and heated for four hours in a muffle furnace at 400° C. The finished catalyst contains 5.8% of active composition and 0.35% of vanadium pentoxide.

In the oxidation of o-xylene at 410° C., the catalyst thus prepared yields (under the conditions of Example 4) 46.2 g. of phthalic anhydride and 2.3 g. of maleic anhydride per hour. The yield of phthalic anhydride by weight with reference to pure o-xylene is 114.8%. The theoretical yield is 82.4%.

An analogous result is achieved when the carrier is primed with the same amount of tungstic acid instead of with molybdic acid.

EXAMPLE 7

250 cc. of magnesium silicate spheres having a diameter of 5.5 mm. are coated in a heated coating drum with a paste which has been prepared from 106 g. of titanium dioxide, 16 g. of vanadyl oxalate, 1.4 g. of ammonium molybdate, 25 g. of formamide and 30 g. of water, until there is 26 g. of the composition on the spheres. The spheres are then heated in a muffle furnace for two hours at 450° C. 1000 liters of air and 44.7 g. of 98% o-xylene at 390° C. are passed per hour over the catalysts thus prepared. 49.7 g. of phthalic anhydride and 1.9 g. of maleic anhydride are obtained per hour.

With reference to pure o-xylene, the yield by weight of phthalic anhydride is 113.5%. The theoretical yield is 81.2%.

We claim:

1. A catalyst containing vanadium and titanium for the oxidation of aromatic hydrocarbons or unsaturated aliphatic hydrocarbons into carboxylic acids or carboxylic acid anhydrides, said catalyst comprising an inert nonporus carrier having a mean particle size of at least about 2 mm. coated with a layer of a composition 0.02 to 2 mm. thick which consists essentially of 1 to 15% by weight of vanadium pentoxide and 85 to 99% by weight of titanium dioxide, the catalyst having a content of vanadium pentoxide of from 0.05 to 3% by weight.

2. A catalyst as claimed in claim 1 wherein the inert nonporous carrier has a surface area of less than 3 sq. m. per gram.

3. A catalyst as claimed in claim 1 wherein the inert nonporous carrier has a mean particle size of 2 to 10 mm.

4. A catalyst as claimed in claim 1 whose carrier is pretreated with 0.5 to 1.5% by weight of at least one oxide of the metals vanadium, molybdenum, tungsten, chromium, titanium or iron, prior to being coated with the vanadium pentoxide/titanium dioxide composition.

5. A catalyst as claimed in claim 1 whose composition used as a coating contains not only vanadium pentoxide and titanium dioxide, but also at least one oxide of the metals silver, iron, cobalt, nickel, chromium, molybdenum and tungsten in an amount of 0.1 to 3% by weight with reference to the composition used as coating.

6. A catalyst as claimed in claim 1 whose carrier has a surface area of 0.005 to 2 sq. m/g.

7. A catalyst as claimed in claim 1 whose carrier is in the form of spheres.

8. A catalyst as claimed in claim 1 consisting essentially of 1 to 15% by weight of vanadium pentoxide and 85 to 99% by weight of titanium dioxide coated to a thickness of about 0.05 to 1 mm. on said inert nonporous carrier which has a surface area of about 0.005 to 2 sq. m./gram, the content of vanadium pentoxide in said catalyst being about 0.1 to 2% by weight.

9. A catalyst as claimed in claim 8 wherein the content of vanadium pentoxide in said catalyst is about 0.1 to 1% by weight.

10. A catalyst as claimed in claim 8 wherein said carrier is coated with a single layer of the vanadium pentoxide/titanium dioxide composition which contains up to 3% by weight thereof of at least one oxide of a metal selected from the group consisting of silver, iron, cobalt, nickel, chromium, molybdenum and tungsten.

11. A catalyst as claimed in claim 8 wherein said carries is precoated with a first layer of 0.05 to 1.5% by weight thereof of at least one oxide of a metal selected from the group consisting of vanadium, molybdenum, tungsten, chromium, titanium and iron with a second layer of said vanadium pentoxide/titanium dioxide applied thereover as a second layer.

References Cited

UNITED STATES PATENTS

| 2,510,803 | 6/1950 | Cooper | 252—464 |
| 2,698,306 | 12/1954 | Matejczyk | 252—464 |
| 3,055,842 | 9/1962 | Robinson | 252—461 |
| 3,215,644 | 11/1965 | Kakinoki et al. | 252—461 |

DANIEL E. WYMAN, Primary Examiner

P. N. FRENCH, Assistant Examiner

U.S. Cl. X.R.

252—456, 461, 464, 467, 470, 476